Figure 1:
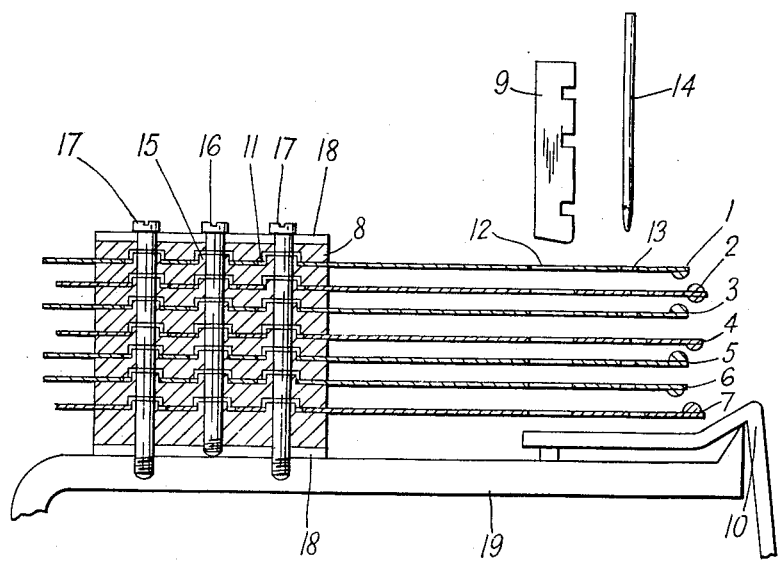

Oct. 2, 1956   S. C. SMITH   2,765,381
CONTACT SPRING ASSEMBLIES
Filed March 25, 1955   2 Sheets-Sheet 1

Inventor
SIDNEY CHARLES SMITH.

By
Larson and Whiting
Attorney

Oct. 2, 1956    S. C. SMITH    2,765,381
CONTACT SPRING ASSEMBLIES
Filed March 25, 1955    2 Sheets-Sheet 2
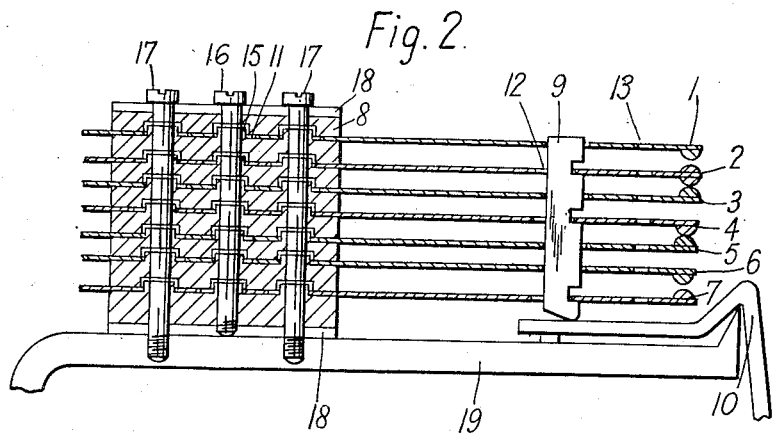
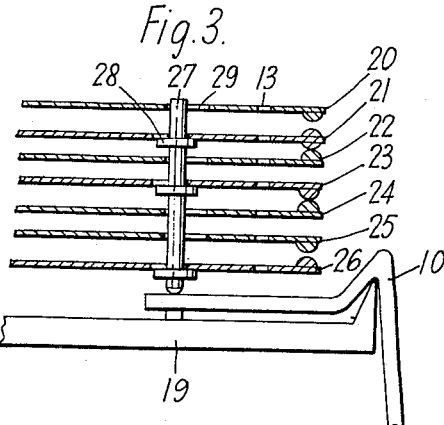
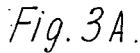
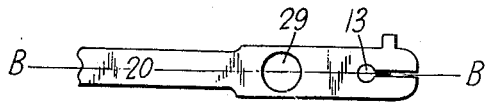
Inventor
SIDNEY CHARLES SMITH
By
Larson & Whiting Attorney United States Patent Office 2,765,381
Patented Oct. 2, 1956

2,765,381

CONTACT SPRING ASSEMBLIES

Sidney Charles Smith, Blackheath, London, England, assignor to Siemens Brothers & Co. Limited, London, England, a British company Application March 25, 1955, Serial No. 496,901

Claims priority, application Great Britain April 21, 1954

3 Claims. (Cl. 200—166)

This invention relates to contact spring assemblies of the kind employed in electromagnetic relays, automatic switches and like equipment in which a plurality of contact springs are secured together and insulated from one another towards one end in a pile, the pile containing so-called fixed and moving springs, and in which contacts are operable by the actuation of an operating stud adapted to engage the moving springs of the pile, and to a method of building up such a contact spring assembly.

In designing a contact spring assembly of the kind referred to it is desirable to keep the variety of parts constituting the assembly small and to avoid close fits and tolerances in the design of the parts themselves which would render the parts difficult of mass production. It is further desirable that the operating stud once inserted in position in the spring pile should be held captive within this pile, with only a small amount of free play. This is necessary in order to ensure that the operating stud cannot come out of engagement with the moving contact springs, and so that the actuating member on which the stud rests can be removed for any necessary adjustment, without danger of the stud falling out of place and preventing easy replacement of the stud actuating member.

In previously proposed arrangements the above requirements have necessitated the addition of one or more springs to the contact pile to hold or locate the operating stud in place or the use of a specially shaped stud which is adapted to lock on to one or more of the contact springs in the pile. In this latter construction since the stud has to be manipulated into its locked on position on the locking contact springs, the formation of the apertures in these springs and the shaping of the stud have to be carried out to close tolerances to ensure that the stud can be inserted by manipulation but that when once inserted it cannot fall out of position even if its position within the spring pile is varied, due for example to the removal of the stud actuating member for adjustment as hereinbefore mentioned. The insertion of the stud may involve the flexure of the locking springs.

It is an object of the present invention to provide a contact spring assembly of the kind referred to in which the operating stud furnished with projections in the form of teeth, shoulders, collars or the like, when inserted in place in the spring pile, is held captive solely by a locking action of the contact springs themselves without the need for any additional holding or locating springs and in which no close tolerances are required either in the formation of apertures for the accommodation of the stud in the contact springs or in the manufacture of the stud itself. A further object of the present invention resides in a method of building up a contact spring assembly of the kind referred to which may be carried out quickly and in a simple manner.

According to one feature of the present invention, there is provided a contact spring assembly comprising so-called fixed and moving springs in which for the accommodation of the operating stud the springs are provided near their free ends with apertures which are of the same shape and size for all the springs and in which the apertures in the moving springs lie at a distance from the free ends of these springs different from those of the fixed springs and in which the lengthwise displacement of the apertures in the moving springs with respect to apertures in the fixed springs is such that the greatest cross-sectional dimension of the clear passage through the spring pile is less than the corresponding dimension across the projections of the operating stud.

According to another feature of the present invention there is provided a method of building up a stud operated contact spring assembly of the kind referred to comprising arranging the springs with the apertures therein aligned, inserting the operating stud through the clear passage formed by the aligned apertures, moving the springs lengthwise to bring the contacts into line and so that the greatest cross-sectional dimension of the clear passage through the springs is less than the corresponding dimensions across the projections on the operating stud and clamping the springs in the position to which they have been moved.

Figure 1A:

By way of example specific embodiments of the present invention and the method of assembling the springs will now be described with reference to the accompanying drawings of which: Fig. 1 is a side elevation of a contact spring pile secured to the yoke of an electromagnetic relay, the springs being shown in section along the line A—A as indicated in Fig. 1A with their apertures aligned ready for the insertion of the operating stud, and a comb shaped operating stud and a plunger pin being shown poised above their respective apertures; Fig. 1A is a plan view of a fixed spring employed in the contact spring pile illustrated in Fig. 1, Fig. 2 is a similar view to that of Fig. 1 with the contact springs moved into their final position and the operating stud positioned within the spring pile. Fig. 3 illustrates a portion of a contact spring assembly utilizing a pin shaped operating stud, the springs being shown in section along the line B—B as indicated in Fig. 3A and Fig. 3A illustrates a part plan view of a fixed spring employed in the contact spring assembly illustrated in Fig. 3.

Referring to Figs. 1 and 1A the contact spring pile comprises seven contact springs having the references 1 to 7 each of which has three elongated holes 11 punched in the broad section and a rectangular aperture 12 formed towards the end of the spring as shown, the shape and size of the holes and apertures being the same for all the springs, but in the case of a moving spring the aperture 12 lies at a greater distance from the free end of the spring than the like aperture of a fixed spring. The elongated holes 11 in a moving spring are displaced with respect to those in a fixed spring so that the springs of the two kinds are free to move in opposite directions. A further hole 13 terminates the bifurcating slit at the contact carrying end of the spring. The springs are shown secured in a pile each spring being insulated and separated from adjacent springs by means of insulating spacers 8, and each spacer except the uppermost having tubular projections 15 which pass through the elongated holes 11 of a spring into cavities formed in the lower face of a superimposed spacer. Poised above the springs is shown a comb shaped operating stud 9 comprising a rectangular block of hard insulating material such as ceramic with teeth spaced along the right hand narrow face, the lower end of the stud being shaped to make line contact with the armature 10 pivoted on the knife edge of the yoke. Alongside the stud is shown a metal plunger pin 14 of circular cross section tapered at its lower end. The spring pile is shown secured to the yoke 19 of an electromagnetic relay by means of two screws 17 which pass through holes in the metal clamping plates 18 and the spacers 8 into tapped holes located towards the heel end of the yoke. The middle screw 16 engages a tapped hole in the lower clamping plate 18 and secures the spring pile independently of the yoke 19. In the arrangement illustrated there are provided three contact units, namely, a changeover, a break and a make, and the moving springs 2, 4 and 7 of the spring sets have been fully displaced to the right whereas the fixed springs 1, 3, 5 and 6 have been fully displaced to the left during the preliminary arrangement of the springs. It will be appreciated that the extent of the displacements referred to is determined solely by the elongation of the holes 11, the degree of which is such that all the apertures 12 in the springs 1—7 are aligned with one another, thus allowing the operating stud 9 to be readily inserted into position with its lower edge resting on the armature 10. To bring the contact springs into their final position the plunger pin 14 with the tapered end foremost is threaded through the hole 13 of each of the springs in turn. By this operation the fixed and moving springs are moved relative to one another in a lengthwise direction and the moving springs 2, 4 and 7 are caused to engage with the teeth of the operating stud substantially as illustrated in Fig. 2.

Referring now to Fig. 2, the arrangement shows the operating stud within the spring assembly and illustrates the displacement of apertures 12 in the moving springs 2, 4 and 7 with respect to like apertures in the fixed springs 1, 3, 5, and 6. It will be seen that the teeth of the operating stud engage with the moving springs and that the contacts of the springs are operable by the upward actuation of the stud. As illustrated the stud has a small amount of lateral play within the contact spring assembly but due to the engagement by the teeth of the operating stud with the front edge of the apertures in the moving spring while the rear edge of the apertures in the fixed springs abuts the rear of the stud the stud cannot be removed from the assembly without the lengthwise displacement of the springs.

Fig. 3 shows a portion of a contact spring assembly comprising contact springs having the references 20 to 26, the contacts of which constitute similar units to those employed in the arrangements shown in Figs. 1 and 2. The operating stud 27 comprises a stem of circular cross-section composed of hard insulating material having three collars 28 of metal or insulating material spaced along its length. It is shown disposed within the spring assembly with the collars referred to engaging the underside of the moving springs 21, 23 and 26, the contacts of the springs being operable by the upward actuation of the stud. In this example however the aperture 29 through which the operating stud passes in circular and is clearly shown in Fig. 3A which represents a part plan view of a fixed spring. The method of assembling the springs in this arrangement is substantially as described in connection with Figs. 1, 1A and 2.

The specific embodiments which have been described with reference to the accompanying drawings employ a plurality of contact units. In the case, however, of a single contact unit being employed it would be necessary to provide an additional spring having no contacts and having an aperture of the appropriate shape and size for the passage of the operating stud. Such a spring would be located either above or below the contact springs according to the type of contact unit employed.

What is claimed is:

1. A stud-operated contact spring assembly comprising so-called fixed and moving springs in which the springs for the accommodation of the operating stud are provided near their free ends with apertures which are of the same size and shape for all the springs and in which the apertures in the moving springs lie at a distance from the free ends of these springs different from those of the fixed springs and means for displacing the apertures lengthwise so that the lengthwise displacement of the apertures in the moving springs with respect to apertures in the fixed springs is such that the greatest cross-sectional dimension of the clear passage through the springs is less than the corresponding dimensions over the spring actuating projections on the operating stud.

2. A stud-operated contact spring assembly according to claim 1 in which said displacing means includes elongated holes in said springs towards their clamped ends and in which the elongation of these holes in a moving spring is in a direction opposite to that of those in a fixed spring.

3. The method of building up a stud-operated contact spring assembly in which so called fixed and moving springs are employed comprising arranging the springs with the apertures therein aligned, inserting the operating stud through the clear passage formed by the aligned apertures, moving the springs lengthwise to bring the contacts into line and so that the greatest cross-sectional dimension of the clear passage through the springs is less than the corresponding dimension across the spring actuating projections on the operating stud and clamping the springs in the position to which they have been moved.

References Cited in the file of this patent

UNITED STATES PATENTS

| | | |
|---|---|---|
| 2,580,123 | Pfleger | Dec. 25, 1951 |
| 2,632,065 | Smith et al. | Mar. 17, 1953 |